United States Patent

Bäuerlein et al.

Patent Number: 6,103,416
Date of Patent: Aug. 15, 2000

[54] LAMINATED LITHIUM-ION CELL AND PROCESS FOR FABRICATING SAME

[75] Inventors: Peter Bäuerlein, Bad Camber; Johanna Oberhauser, Kelkheim; Hans-Walter Praas, Ellwangen; Hermann Schomann, Langen, all of Germany

[73] Assignee: Varta Batterie Aktiengesellschaft, Hannover, Germany

[21] Appl. No.: 09/037,030

[22] Filed: Mar. 9, 1998

[30] Foreign Application Priority Data

Mar. 10, 1997 [DE] Germany ............... 197 09 783

[51] Int. Cl.$^7$ ................................. H01M 6/00
[52] U.S. Cl. ............. 429/127; 429/162; 429/231.95; 29/623.3
[58] Field of Search .................. 429/127, 162, 429/231.95, 231.8, 231.5, 249, 250, 224, 233; 29/623.3, 623.4, 623.5

[56] References Cited

U.S. PATENT DOCUMENTS

| | | |
|---|---|---|
| 4,902,589 | 2/1990 | Dahn et al. |
| 5,360,684 | 11/1994 | Duval et al. |
| 5,464,707 | 11/1995 | Moulton et al. |
| 5,470,357 | 11/1995 | Schmutz et al. |
| 5,523,179 | 6/1996 | Chu |
| 5,824,120 | 10/1998 | Mitchell et al. ............ 29/623.1 |

Primary Examiner—Maria Nuzzolillo
Assistant Examiner—Susy Tsang
Attorney, Agent, or Firm—Schnader Harrison Segal & Lewis LLP

[57] ABSTRACT

The invention relates to a laminated lithium-ion cell which comprises flexible layers, wherein the negative electrode is lithium metal, lithium alloy or a metallic bonded fiber web or a foam, which comprises a lithium-intercalating material such as carbon, graphite, tungsten dioxide, molybdenum dioxide, titanium dioxide, titanium disulfide or vanadium pentoxide as the active component, the separator is made of a porous polymer in which a non-aqueous electrolyte is immobilized, and the positive electrode as the active material comprises lithiated manganese dioxide, manganese spinel, lithium-metal oxides, lithium-metal mixed oxides or lithium-metal sulfides.

22 Claims, 4 Drawing Sheets

LAMINATED LITHIUM-ION CELL AND PROCESS FOR FABRICATING SAME

BACKGROUND OF THE INVENTION

1. Field of the Invention

The invention relates to a laminated lithium-ion cell and to a process for fabricating it. In particular the invention relates to rechargeable lithium-ion cells which comprise a separator made of a porous polymer material. This polymer matrix has ionic conductivity, since it comprises a solution of a dissociable lithium salt in an organic solvent. Lithium ions are therefore able to move from one electrode to the other through the separator.

2. Description of the Related Art

Laminated lithium-ion cells are disclosed by U.S. Pat. No. 5,470,357. The positive and negative electrode and also the separator each have a flexible, polymer matrix. By means of heat and pressure they are bonded with polymer-coated current collector foils to produce a flexible laminate structure. All of the polymers employed for the electrodes, the separator and the precoating of the current collector foils, respectively, must, in such a process, be mutually compatible. In all cases a copolymer of vinylidene difluoride and hexafluoropropylene (PVdF-HFP-copolymer) is used preferentially. The known lithium-ion cells therefore require a polymer matrix for the fabrication of the electrode layers and separator layers.

SUMMARY OF THE INVENTION

It is an object of the invention to specify laminated lithium-ion cells and methods for fabricating them, which make lithium metal, lithium alloys or metallic electrode support materials available for laminated cells.

The laminated lithium-ion cells accordingly comprise flexible layers, wherein the negative electrode is lithium metal, lithium alloy or a metallic bonded fiber web or a foam, which comprises a lithium-intercalating material such as carbon, graphite, tungsten dioxide, titanium dioxide, titanium disulfide, molybdenum dioxide or vanadium pentoxide as the active component. The separator is made of a porous polymer in which a non-aqueous electrolyte is immobilized, and the positive electrode as the active material comprises lithiated manganese black, manganese spinel, lithium-metal oxides, lithium-metal mixed oxides or lithium-metal sulfides. Initially, the separator is inactive, being only a plasticized polymer. The non-aqueous electrolyte later replaces the plasticizer after lamination.

If lithium metal or lithium alloy is used, an electrochemically stable, metallic grid or mesh is co-laminated in as a current collector. The outer surface of the negative electrode, that facing away from the cathode, may be masked by a polymer foil of the separator material. Equally, a portion of the polymer material masking the negative electrode can be removed prior to insertion into a cell jacket for use. The cells do not require any external application pressure. Alternatively, the negative electrode may comprise a bonded fiber web or foam body, which is made from nickel and pasted into which are lithium intercalation compounds such as carbon materials, graphite or metal oxides such as $MoO_2$, $WO_2$, $TiO_2$, $V_2O_5$ or metal sulfides such as $TiS_2$ together with electrically conductive additives such as conductive blacks and binders such as dispersions of polytetrafluoroethylene (PTFE), of poly(ethylene oxide)(PEO) or of poly(vinylidene difluoride) (PVdF). The negative electrode tape thus obtained is then dried and densified by rolling. By preference, the negative electrodes are precoated with a poly(ethylene oxide) (PEO) dispersion 10. An addition of graphite to the PEO dispersion enables prelithiation of the graphite. The current collector used is preferably expanded copper metal or a copper mesh.

The support used in the positive electrode can be a bonded fiber web, expanded metal or mesh which is made of nickel or aluminum and into which the manganese black or lithiated manganese blacks, spinels or lithium-metal oxides such as $LiNiO_2$, $LiCoO_2$ together with conductive blacks and abovementioned binders are pasted.

The electrode stack, laminated together from the positive and negative electrode with the separator, of the novel lithium-ion cell can after laminating be handled in dry rooms or even at normal humidity, i.e., in the range of from 1 to 50% humidity. The electrode stack can be stored without any loss of capacity. Activation takes place only when the non-aqueous electrolyte is introduced. This is effected either by the plasticizer being extracted and the electrode stack then being impregnated with the solution of the conducting salt in an organic solvent, or by the plasticizer being exchanged directly for the electrolyte, i.e., the laminated electrode stack is stored in the electrolyte solution for a period of from 5 to 30 minutes. This requires a protective-gas atmosphere having an $H_2O$ level in the ppm range. The novel laminated lithium-ion cells are suitable, in particular, for the fabrication of very thin and flexible cells having an area up to 50 $cm^2$, whose thickness is between 200 $\mu m$ and 1 mm.

BRIEF DESCRIPTION OF THE DRAWINGS

The invention is explained below in more detail with reference to examples and to figures, in which.

DETAILED DESCRIPTION

Figure 1:
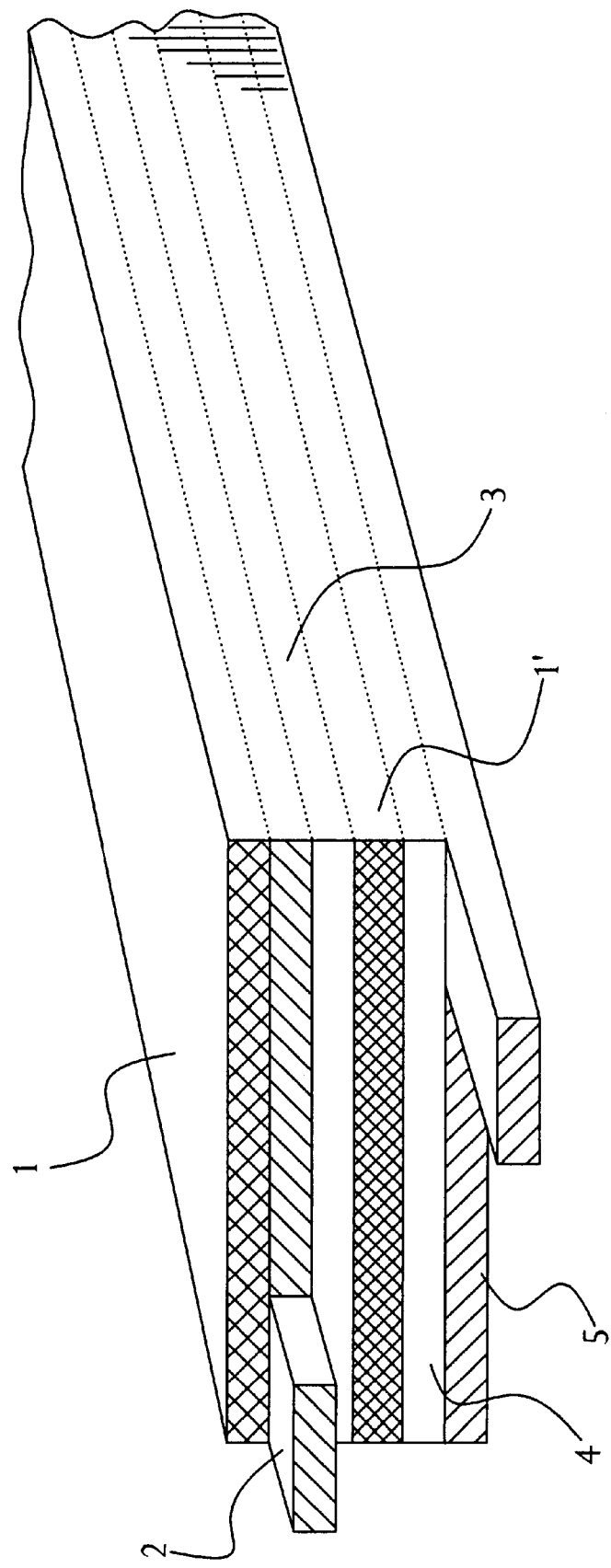
FIG. 1 shows a schematic, perspective view of a laminated electrode stack, according to one embodiment of the present invention.

FIG. 1 shows a schematic, perspective view of a laminated electrode stack, according to one embodiment of the present invention. Label numbers 1 and 1' indicate sheets of the separator (for example, vinylidene difluoride). Label number 2 indicates the current collector for the negative electrode. Label number 3 indicates the active material of the negative electrode (for example, lithium foil). Label number 4 indicates the active material of the positive electrode (for example, manganese dioxide). Label number 5 indicates the current collector for the positive electrode.

Figure 2:
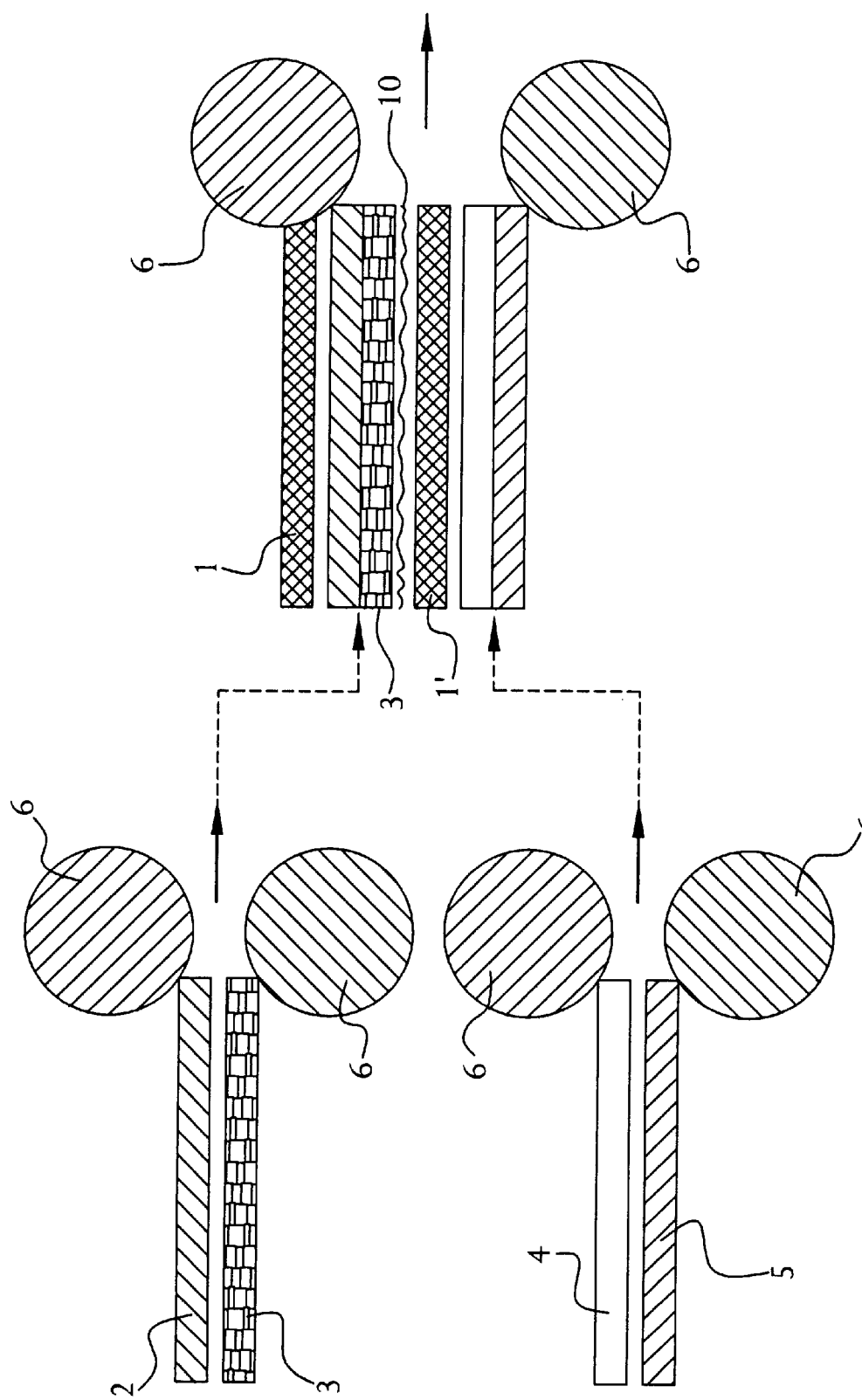
FIG. 2 shows a schematic, cross-section view of the process of manufacturing the laminated electrode stack of FIG. 1.

FIG. 2 shows a schematic, cross-section view of the process of manufacturing the laminated electrode stack of FIG. 1. As shown in FIG. 2, the various sheets of material for the different layers in the electrode stack of FIG. 1 are laminated together in stages by feeding the sheets between parallel cylindrical rollers 6 that press the sheets together.

EXAMPLE 1

To prepare the cathode material,
22 g of $LiMnO_2$,
5.9 g of PVdF,
2.6 g of conductive black,
9 g of dibutyl phthalate in
75 ml of acetone,
are dispersed and by means of knife-coating using a gap of a width of 850 μm, are drawn out to produce a film. The film is dried within about 10 minutes. The cathode foil 4 is then, by means of lamination onto expanded aluminum metal at 175° C., provided with a current collector 5 and divided into rectangular pieces having an area of 24.75 $cm^2$.

The anode material is obtained by expanded copper metal 2 being roller-plated with a lithium foil 3 having a thickness of about 250 μm, and by the edges which contain no lithium or do not contain it everywhere being removed.

The cell stack essentially comprising the abovementioned materials and a PVdF separator material is obtained by stacking pieces of the abovementioned materials on top of one another. The final cell stack comprises, in order, a layer 1 of PVdF separator material having a thickness of about 110 μm which masks the outer surface of the anode, the anode material and a second layer 1' of PVdF separator material having a thickness of about 55 μm being placed on that side of the cathode material which faces away from the cathode's current collector, i.e., between the active materials of the anode and cathode. In this arrangement the rim of the PVdF separators projects beyond the anode material by about 5 mm on all sides. This cell stack is laminated from both sides, at about 140° C., on a roller frame whose contact surface is heated. The cell stack obtained has an overall thickness of 720 μm. To remove the plasticizer, the laminated cell stack is extracted three times with anhydrous diethyl ether, with stirring, and is then dried. The cell stack thus treated is impregnated with an electrolyte solution consisting of a 1 M $LiPF_6$ solution in a 1:1 mixture of ethylene carbonate (EC) and diethyl carbonate (DEC) for about 30 min, excess electrolyte is removed, followed by sealing into metallized multilayer foil material, this being a metallized polyethylene/polypropylene foil.

The cells have a specific capacity of 120 mAh at a constant discharge current density of 0.12 $mA/cm^2$.

EXAMPLE 2

A cathode material as in Example 1, except that it comprises tributyl phosphate (TBP) as a plasticizer, is drawn out on a knife-coating bench to produce a sheet, a gap width of 900 μm being used. After the sheet has been dried, it is laminated onto expanded aluminum metal 5 at 158° C., the cathode foil 4 and the expanded metal being placed between two teflon sheets.

The anode material used is the lithium metal foil 3, obtainable in accordance with Example 1, on expanded copper metal 2.

Used as the separator is a PVdF film 1, 1' which is cast with a gap width of 500 μm and which comprises 20 wt % of $SiO_2$, 30 wt % of PVDF and 50 wt % of tributyl phosphate.

The cell stack is laminated together from the abovementioned components in a manner similar to that of Example 1 and is stored for 15 minutes, with stirring, in the electrolyte consisting of a 1 M $LiClO_4$ solution in propylene carbonate (PC). The electrolyte-containing cell stacks are sealed into metallized multilayer foils, in accordance with Example 1.

Figure 3:
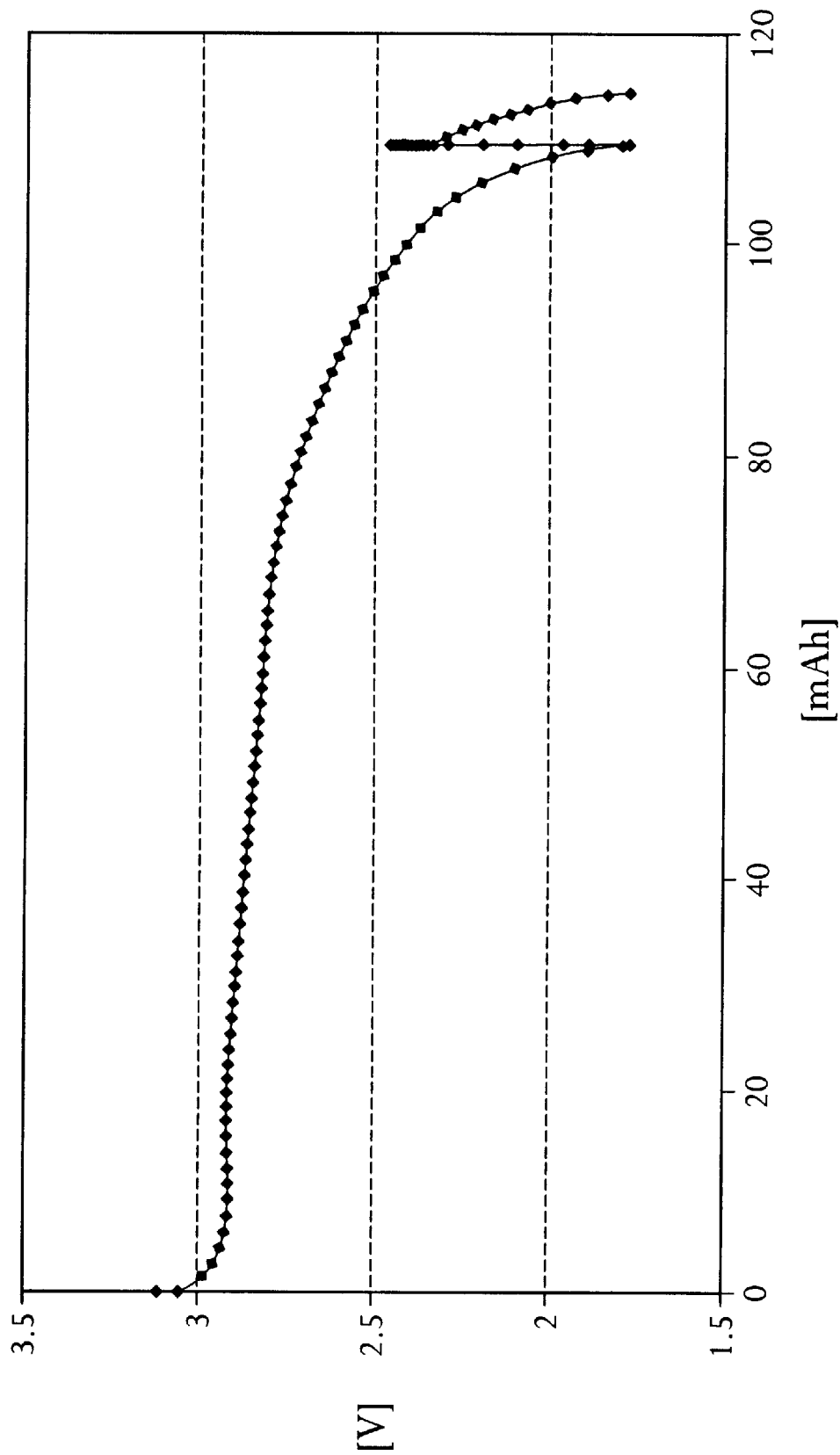
FIG. 3 shows the discharge diagram of a cell which was fabricated in accordance with Example 2 and was discharged at room temperature with a constant discharge current of 3 mA as far as a cut-off voltage of 1.8 V and was post discharged with a constant discharge current of 1 mA.

FIG. 3 shows the profile of the cell voltage in volts against the capacity drawn, in mAh, under constant discharge current conditions at room temperature, discharging taking place with 3 mA as far as a cut-off voltage of 1.8 V, followed by post discharging with 1 mA.

Figure 4:
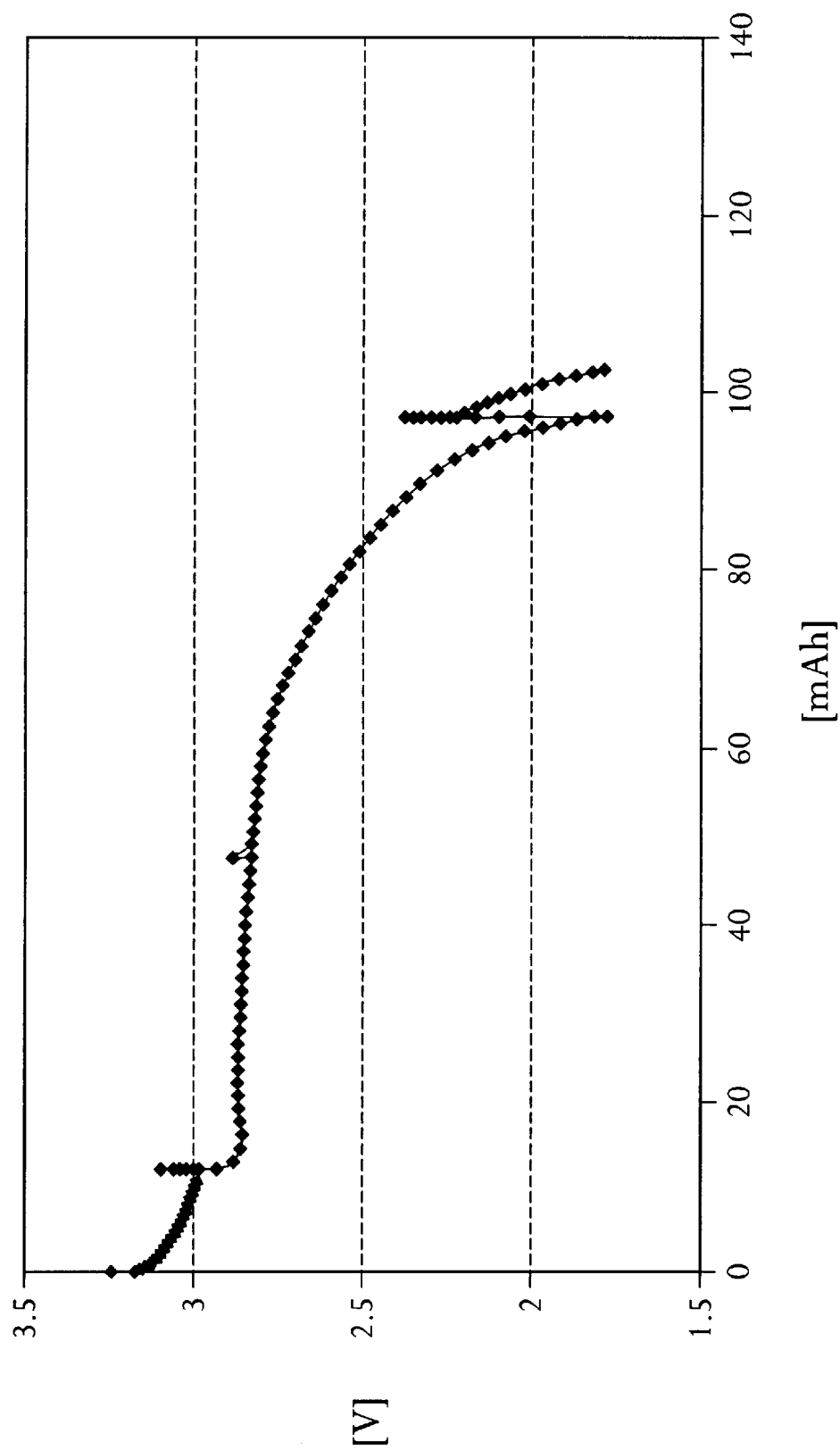
FIG. 4 shows the discharge diagram of a cell which was fabricated in accordance with Example 2 and prior to being discharged was stored under the abovementioned conditions for 36 days at 60° C.

FIG. 4 shows the discharge diagram of an analogous cell, except that this had been stored for 36 days at 60° C. prior to discharging.

EXAMPLE 3

A cathode material 4, 5 was prepared by a method similar to that of Example 1, except that lithium spinel was used as the active component.

The anode 2, 3 prepared in a manner similar to that of Example 1 is coated with a suspension of ethylene carbonate, poly(ethylene oxide) in tetrahydrofuran.

The separator 1' used comprises 30 wt % of a poly(vinylidene difluoride)/hexafluoropropylene copolymer which contains 20 wt % of $SiO_2$ and 50 wt % of dibutyl phthalate.

The cell stack consisting of cathode material 4, 5, separator 1' and anode material 2, 3 is laminated together at from 70 to 100° C. and is impregnated with an electrolyte consisting of $LiPF_6$ in a 2:1 mixture of EC and DMC. The cells obtained in accordance with Example 1 by the cell stack being sealed into a metallized multilayer foil have a specific capacity of 43.5 mAh for a 9 hour discharge.

EXAMPLE 4

In a manner similar to that of Example 1, cells are fabricated except that a polypropylene separator in accordance with Example 1 is additionally co-laminated and a lithiated manganese black is used.

The completed cells have a specific cell capacity of 25.5 mAh when discharging takes place at a constant current of 3 mA.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A laminated lithium-ion cell having flexible layers comprising:
   (a) a negative electrode made of lithium metal or lithium alloy supported on a current collector;
   (b) a separator made of a porous polymer material in which a non-aqueous electrolyte can be immobilized; and
   (c) a positive electrode having an active material comprising lithiated manganese black, manganese spinel, lithium-metal oxides, lithium-metal mixed oxides, or lithium-metal sulfides supported on a current collector,
   wherein said separator is disposed between said active materials of said positive and said negative electrodes, and wherein said negative electrode is masked on the side facing away from the positive electrode, by means of a second separator.

2. The laminated lithium-ion cell of claim 1, wherein:
   the negative electrode is precoated with a poly(ethylene oxide) dispersion comprising graphite;

wherein at least one of the current collectors is a metallic grid or mesh;

the separators comprise polypropylene, polyethylene, poly(ethylene oxide), poly(vinylidene difluoride), polytetrafluoroethylene, polyamide, or copolymers or terpolymers thereof; and the electrodes and the separator between the electrodes have an area of up to 50 cm$^2$ and a thickness of up to 1 mm.

3. The laminated lithium-ion cell of claim 1, wherein the negative electrode is precoated with a poly(ethylene oxide) dispersion prior to lamination with said positive electrode and said separators.

4. The laminated lithium-ion cell of claim 3, wherein the poly(ethylene oxide) dispersion comprises graphite.

5. The laminated lithium-ion cell of claim 1, wherein at least one of the current collectors is a metallic grid or mesh.

6. The laminated lithium-ion cell of claim 1, wherein the separators comprise polypropylene, polyethylene, poly(ethylene oxide), poly(vinylidene difluoride), polytetrafluoroethylene, polyamide, or copolymers or terpolymers thereof.

7. The laminated lithium-ion cell of claim 1, wherein the electrodes and the separator between the electrodes have an area of up to 50 cm$^2$ and a thickness of up to 1 mm.

8. A laminated lithium-ion cell having flexible layers, comprising:

(a) a negative electrode of a metallic bonded fiber web or a foam comprising a lithium-intercalating material having titanium dioxide, titanium disulfide, or vanadium pentoxide as an active component supported on a current collector;

(b) a separator made of a porous polymer material in which a non-aqueous electrolyte can be immobilized; and (c) a positive electrode having an active material comprising lithiated manganese black, manganese spinel, lithium-metal oxides, lithium-metal mixed oxides, or lithium-metal sulfides supported on a current collector, wherein said separator is disposed between said active materials of said positive and said negative electrodes and wherein said negative electrode is masked on the slide facing away from the positive electrode, by means of a second separator.

9. The laminated lithium-ion cell of claim 8, wherein at least one of the current collectors is a metallic grid or mesh.

10. The laminated lithium-ion cell of claim 9, wherein the electrodes and the separator between the electrodes have an area of up to 50 cm$^2$ and a thickness of up to 1 mm.

11. The laminated lithium-ion cell of claim 8, wherein the separators comprise polypropylene, polyethylene, poly(ethylene oxide), poly(vinylidene difluoride), polytetrafluoroethylene, polyamide, or copolymers or terpolymers thereof.

12. The laminated lithium-ion cell of claim 11, wherein the electrodes and the separator between the electrodes have an area of up to 50 cm$^2$ and a thickness of up to 1 mm.

13. The laminated lithium-ion cell of claim 8, wherein the electrodes and the separator between the electrodes have an area of up to 50 cm$^2$ and a thickness of up to 1 mm.

14. The laminated lithium-ion cell of claim 9, wherein the separators comprise polypropylene, polyethylene, poly(ethylene oxide), poly(vinylidene difluoride), polytetrafluoroethylene, polyamide, or copolymers or terpolymers thereof.

15. The laminated lithium-ion cell of claim 8, wherein said negative electrode is precoated with a poly(ethylene oxide) dispersion prior to lamination with said positive electrode and said separators.

16. A process for fabricating a laminated lithium ion cell, the cell comprising:

(a) providing a negative electrode made of lithium metal or lithium alloy supported on a current collector;

(b) providing a separator made of a porous polymer material in which a non-aqueous electrolyte can be immobilized; and (c) providing a positive electrode having an active material comprising lithiated manganese black, manganese spinel, lithium-metal oxides, lithium-metal mixed oxides, or lithium-metal sulfides supported on a current collector;

masking the negative electrode on the side facing away from the positive electrode, by means of a second separator, wherein the separators comprise a plasticizer.

17. The process of claim 16, wherein:

the negative electrode is precoated with a poly(ethylene oxide) dispersion comprising graphite;

wherein at least one of the current collectors is a metallic grid or mesh;

the separators comprise polypropylene, polyethylene, poly(ethylene oxide), poly(vinylidene difluoride), polytetrafluoroethylene, polyamide, or copolymers or terpolymers thereof; and the electrodes and the separator between the electrodes have an area of up to 50 cm$^2$ and a thickness of up to 1 mm.

18. The process of claim 16, wherein a portion of the separator masking the negative electrode is removed before the cell is put into service.

19. The process of claim 16, wherein the plasticizer, before the cell is put into service, is exchanged for a non-aqueous electrolyte.

20. A process for fabricating a laminated lithium-ion cell having flexible layers, comprising the steps of:

(a) providing a negative electrode of a metallic bonded fiber web or a foam comprising a lithium-intercalating material having carbon, graphite, tungsten dioxide, titanium dioxide, titanium disulfide, molybdenum dioxide, or vanadium pentoxide as an active component supported on a current collector;

(b) providing a separator made of a porous polymer in which a non-aqueous electrolyte can be immobilized;

(c) providing a positive electrode having an active material comprising lithiated manganese black, manganese spinel, lithium-metal oxides, lithium-metal mixed oxides, or lithium-metal sulfides supported on a current collector, (d) disposing said separator between the active materials of said positive and negative electrodes; and (e) masking said negative electrode on the side facing away from said positive electrode by means of a second separator;

wherein the separators comprise a plasticizer.

21. The process of claim 20, wherein the plasticizer, before the cell is put into service, is exchanged for a non-aqueous electrolyte.

22. The process of claim 20, wherein said process further includes the step of precoating the negative electrode with a poly(ethylene oxide) dispersion.

* * * * *